(12) United States Patent
Zhang

(10) Patent No.: US 8,090,022 B2
(45) Date of Patent: Jan. 3, 2012

(54) VIDEO CODING SYSTEM

(75) Inventor: Ximin Zhang, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1399 days.

(21) Appl. No.: 11/620,598

(22) Filed: Jan. 5, 2007

(65) Prior Publication Data

US 2008/0165852 A1 Jul. 10, 2008

(51) Int. Cl.
*H04N 11/02* (2006.01)
*H04N 11/04* (2006.01)
*G06K 9/36* (2006.01)

(52) U.S. Cl. ............... 375/240.16; 375/240.24; 382/232

(58) Field of Classification Search .................. None
See application file for complete search history.

(56) References Cited

U.S. PATENT DOCUMENTS

| | | | |
|---|---|---|---|
| 5,508,745 A | 4/1996 | Jo | |
| 5,815,670 A | 9/1998 | Iverson et al. | |
| 5,835,149 A * | 11/1998 | Astle | 375/240.05 |
| 6,148,107 A | 11/2000 | Ducloux et al. | |
| 6,339,617 B1 * | 1/2002 | Ueda | 375/240.16 |
| 6,535,251 B1 | 3/2003 | Ribas-Corbera | |
| 7,095,784 B2 | 8/2006 | Chang et al. | |
| 7,142,600 B1 * | 11/2006 | Schonfeld et al. | 375/240.16 |
| 2003/0123551 A1 * | 7/2003 | Kim | 375/240.16 |
| 2004/0227856 A1 * | 11/2004 | Cooper | 348/512 |
| 2005/0105618 A1 * | 5/2005 | Booth et al. | 375/240.16 |
| 2005/0259738 A1 * | 11/2005 | Horishi et al. | 375/240.16 |
| 2006/0222077 A1 * | 10/2006 | Ohwaki et al. | 375/240.16 |
| 2008/0152008 A1 * | 6/2008 | Sun et al. | 375/240.16 |

FOREIGN PATENT DOCUMENTS

WO WO0040030 A1 7/2000

OTHER PUBLICATIONS

Malinhua Changyilin and Biduyan, A New Rate Control of MPEG Video Encoding for Enhancing Local Image Area Definition, XiDian University, AFEC College, www.ifip.org/con2000/icct2000/icct448.pdf.
N. I. Cho, H. Lee, and S. U. Lee, An Adaptive Quantization Algorithm for Video Coding, IEEE Trans. on Circuits and Systems for Video Technology, 1999, pp. 527-535 v. 9, No. 4.
A. Puri and R. Aravind, Motion-Compensated Video Coding with Adaptive Perceptual Quantization, IEEE Trans. on Circuits and Systems for Video Technology, 1991, pp. 351-361, v. 1, No. 4.
K. Ramchandran, A. Ortega, and M. Vetterli, Bit allocation for dependent quantization with applications to multiresolution and MPEG video coders, IEEE Trans. Image Processing, Sep. 1994, pp. 533-545, v. 3.

(Continued)

*Primary Examiner* — Joseph Ustaris
*Assistant Examiner* — Frederick Bailey
(74) *Attorney, Agent, or Firm* — Mikio Ishimaru

(57) ABSTRACT

A video coding system is provided including generating a motion vector for a macro block in a picture, the motion vectors indicative of displacement of an object in the macro block; grouping a cluster of the motion vectors; and adjusting a dynamic quantization parameter modulation of a subsequent picture based on the grouping for displaying the displacement of the object in the subsequent picture.

9 Claims, 3 Drawing Sheets

OTHER PUBLICATIONS

Liang-Jin Lin, A. Ortega, Bit-rate control using piecewise approximated rate-distortion characteristics, IEEE Trans. on Circuits and Systems for Video Technology, 1998, pp. 446-459, v. 8, No. 4.

Huifang Sun; Kwok, W.; Chien, M.; Ju, C.H.J.; MPEG coding performance improvement by jointly optimizing coding mode decisions and rate control, IEEE Trans. on Circuits and Systems for Video Technology, 1997, pp. 449-458, v. 7, No. 3.

Shan Liu, C.-C.J Kuo, Joint Temporal-Spatial Bit Allocation for Video Coding With Dependency, IEEE Trans. on Circuits and Systems for Video Technology, 2005, pp. 15-26, v. 5, No. 1.

* cited by examiner

VIDEO CODING SYSTEM

TECHNICAL FIELD

The present invention relates generally to video coding systems, and more particularly to a system for high definition video coding.

BACKGROUND ART

With the advent of High Definition broadcasting, the delivery of HD video to cell phones, the high definition television, and the popularity of DVD movies, the term "make it real" has new meaning. Many of the high definition broadcasts are bringing a realism that can only be matched by looking through a window to watch the actual event unfold before you.

In order to make the transfer of high definition video more efficient, different video coding schemes have tried to get the best picture from the least amount of data. The Moving Pictures Experts Group (MPEG) has created standards that allow an implementer to supply as good a picture as possible based on a standardized data sequence and algorithm. The emerging standard H.264 (MPEG4 Part 10)/"Advanced Video Coding" (AVC) design delivers an improvement in coding efficiency typically by a factor of two over MPEG-2, the most widely used video coding standard today. The quality of the video is dependent upon the manipulation of the data in the picture and the rate at which the picture is refreshed. If the rate decreases below about 30 pictures per second the human eye can detect "unnatural" motion.

Due to coding structure of the current video compression standard, the picture rate-control consists of three steps: 1. Group of Pictures (GOP) level bit allocation; 2. Picture level bit allocation; and 3. Macro block (MB) level bit allocation. The picture level rate control involves distributing the GOP budget among the picture frames to achieve a maximal and uniform visual quality. Although Peak Signal to Noise Ratio (PSNR) does not fully represent the visual quality, it is most commonly used to quantify the visual quality. By using it as the criterion, various rate-control schemes may be proposed based on either iterative search or assumed theoretical rate/distortion models.

A GOP is made up of a series of pictures starting with an Intra picture. The Intra picture is the reference picture that the GOP is based on. It may represent a video sequence that has a similar theme or background. The Intra picture requires the largest amount of data because it cannot predict from other pictures and all of the detail for the sequence is based on the foundation that it represents. The next picture in the GOP may be a Predicted picture or a Bidirectional predicted picture. The names may be shortened to I-picture, P-picture and B-picture or I, P, and B. The P-picture uses less data content than the I-picture and some of the change between the two pictures is predicted based on certain references in the picture.

The use of P-pictures maintains a level of picture quality based on small changes from the I-picture. The B-picture has the least amount of data to represent the picture. It depends on information from two other pictures, the I-picture that starts the GOP and a P-picture that is within a few pictures of the B-picture. The P-picture that is used to construct the B-picture may come earlier or later in the sequence. The B-picture requires "pipeline processing", meaning the data cannot be displayed until information from a later picture is available for processing.

In order to achieve the best balance of picture quality and picture rate performance, different combinations of picture sequences have been attempted. The MPEG-2 standard may use an Intra-picture followed by a Bidirectional predicted picture followed by a Predicted picture (IBP). The combination of the B-picture and the P-picture may be repeated as long as the quality is maintained (IBPBP). When the scene changes or the quality and/or picture rate degrades, another I-picture must be introduced into the sequence, starting a new GOP.

The theoretical model based methods do not consider the contents dependency between the reference and current frame while iterative search based methods have unacceptable huge complexity. Moreover, most of model based methods are using almost constant quantization scale through the whole picture. Although they claim good performance, when visual quality based MB rate control is utilized, their claim cannot be guaranteed.

The video coding in the MPEG-2 and MPEG-4 standards use a Quantization Parameter (QP) to control the video quality. A lower value of QP provides better quality pictures and a higher QP value provides lower picture quality. Practically, most of MPEG2 or MPEG4 encoders use a simple strategy: I-picture and P-pictures will use same Quantization Parameter (QP) if no buffer overflow or under flow happens, and a B-picture will use QP+2 as its quantization parameter. This strategy provides good results for pictures with very light complexity. However, the quantization parameter determination or picture bit allocation can not maintain picture clarity over long GOP's.

According to previous research results, the claim that a minimum PSNR difference between frames leads to visual quality fluctuation is not true. Visual quality may vary greatly based on the very little change in PSNR.

Thus, a need still remains for a less complex video coding system that can maintain good picture quality and clarity across long GOP's. These advanced coding schemes are required to bring High Definition video to personal video players, PDA's and video conferencing systems. In view of the increasing demand for viewing "real" events, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have long been sought but prior developments have not taught or suggested any solutions and, thus, solutions to these problems have long eluded those skilled in the art.

DISCLOSURE OF THE INVENTION

The present invention provides a video coding system including generating a motion vector for a macro block in a picture, the motion vectors indicative of displacement of an object in the macro block; grouping a cluster of the motion vectors; and adjusting a dynamic quantization parameter modulation of a subsequent picture based on the grouping for displaying the displacement of the object in the subsequent picture.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
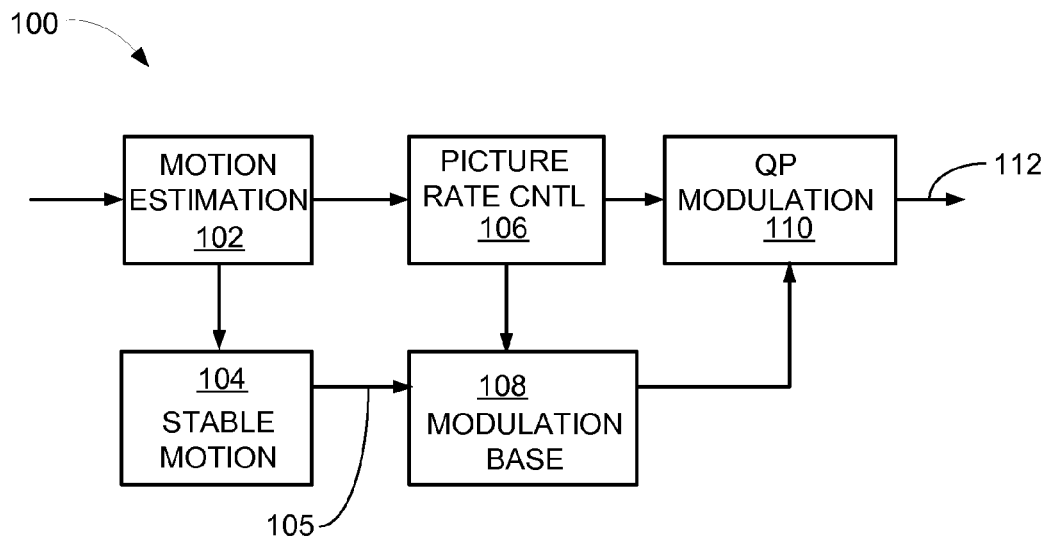
FIG. 1 is a block diagram of a video coding system in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGS. Where multiple embodiments are disclosed and described, having some features in common, for clarity and ease of illustration, description, and comprehension thereof, similar and like features one to another will ordinarily be described with like reference numerals.

For expository purposes, the term "on" means there is direct contact among elements. The term "system" may mean the method or apparatus of the present invention.

Referring now to FIG. 1, therein is shown a block diagram of a video coding system 100, in an embodiment of the present invention. The block diagram of the video coding system 100 depicts a motion estimation circuit 102 coupled to a stable motion circuit 104 and a picture rate control circuit 106. The stable motion circuit 104 supplies an average cluster size 105 to a modulation base circuit 108. The picture rate control circuit 106 is also coupled to the modulation base circuit 108 to supply picture type and timing information. The picture rate control circuit 106 and the modulation base circuit 108 are coupled to a quantization parameter (QP) modulation circuit 110. The output of the QP modulation circuit 110 is a picture level quantization parameter that is applied to a quantization parameter bus 112. A dynamic quantization parameter modulation is provided by the QP modulation circuit 110 based on the picture type being displayed and the order of the picture in a group of pictures.

It was unexpectedly discovered, that up to a 6 db peak signal to noise ration (PSNR) difference may be allowed between the selected reference frame and the subsequent prediction frames without causing quality fluctuation. In this way, more texture details can be shown. Therefore, a content related quantization weighting should obtain better results than the fixed weighting strategy.

The motion estimation circuit 102 is coupled to the picture rate control circuit 106 and may be used to conduct fast integer motion estimation and do some picture analysis. The motion estimation circuit 102 provides the roughly estimated motion vectors and scene change information required by the picture rate control circuit 106. The QP weighting scheme is also based on the information from the motion estimation circuit 102. The motion vector information obtained in the motion estimation circuit 102 is sent to the stable motion circuit 104. The motion vectors are firstly assigned into a set of clusters in this module. Then, the clusters that have substantially the same motion vectors are grouped together. The stable motion area size is extracted. The average cluster size 105 is sent to the modulation base circuit 108. At the same time, the information from the motion estimation circuit 102 is also sent to the picture rate control circuit 106. The initial picture level QP is determined by the picture rate control circuit 106. The QP is based on the amount of stable motion areas in the picture and the rate requirements for the picture.

With the information of stable motion area size provided by the stable motion circuit 104 for a set of pictures and initial picture level QP of the current picture from the picture rate control circuit 106, the base modulation level is generated by the modulation base circuit 108 whenever an Intra picture is encountered. The base modulation level is constant for one GOP and can only adjust in the beginning of the next GOP. After the base modulation level is generated by the modulation base circuit 108, it is sent to the QP modulation circuit 110. In this module, the base modulation level is modified based on the picture type (Intra, Predicted or Bidirectional predicted), coding structure (IP only, IBP or IBBP), stable motion area, and video sequence type (Progressive or interlace). The initial picture level QP is added to the modulation level to obtain the value on the quantization parameter bus 112. Usually, if the criterion is satisfied, the Intra picture QP will be lower and Bidirectional predicted picture QP will be a higher value compared to the initial picture level QP.

The above description is an example only and it is understood that the functions described may be implemented as software, discrete electronic components on a printed circuit board, within an integrated circuit, or a combination thereof.

The modulation base circuit 108 uses information from the stable motion circuit 104 in order to determine the average size of the stable motion area for a GOP. The GOP is bounded by Intra pictures, so the statistics for the GOP are saved within the stable motion circuit 104. The modulation base circuit 108 generates a modulation based on the results of equation 1.

$$\text{Modulation\_base} = \frac{8 * \text{Average\_stable\_size}}{\text{Picture\_size}} \qquad (1)$$

This equation is based on the assumption that the changes in stable motion are small within a scene. At the onset of a new scene another Intra picture would indicate the presence of a new GOP that would require the calculation of a new base modulation for the GOP.

The QP modulation circuit 110 may establish a different modulation level on the quantization parameter bus 112 based on the type of picture being processed. In the AVC encoder, the video sequence can be encoded as IPPP, IBPBP, or IBBP where the "I" indicates an Intra picture, the "P" indicates a Predicted picture, and the "B" indicates a Bidirectional predicted picture in the structure. Each of the series corresponding to a different encoding structure, different modulation schemes are also developed. The dynamic QP modulation scheme is described for IBPBP and IBBP structures.

The encoding structure IBBP is a default standard used since MPEG first became popular. During the I picture coding, a threshold value QP is established. The threshold value QP is formulated for progressive and interlace sequences. The value of QP modulation that is presented to the quantization parameter bus 112 is calculated through the following equations:

For the "I" picture in the sequence, the final QP is calculated by using the following procedure.

First, compare the initial picture QP with the threshold value QP. If it is less than the threshold value QP, assign the initial picture QP as the final QP and skip the modulation process. If it is greater than the threshold, go the next step.

Modulate the initial picture QP with base modulation level and compared to the threshold value QP. If the modulated QP is larger than the threshold value QP, keep it as the final picture QP; or, assign the threshold value QP as the final QP.

For the "B" picture in the IBBP sequence the final QP is calculated by using equation 2.

$$\text{Final\_QP} = \begin{cases} \text{Initial\_QP}, & \text{if Modulation\_base} < 2 \\ \text{Initial\_QP} + \frac{\text{Modulation\_base}}{2} - 1, & \text{if Modulation\_base} >= 2 \end{cases} \quad (2)$$

For the "P" picture in the IBBP sequence the final QP is calculated by using equation 3.

$$\text{Final\_QP} = \begin{cases} \text{Initial\_QP}, & \text{if Modulation\_base} < 2 \\ \text{Initial\_QP} - 1 - \frac{\text{Modulation\_base}}{4}, & \text{if Modulation\_base} >= 2 \end{cases} \quad (3)$$

When a dramatic scene change causes low correlation between pictures, the IBPBP sequence of pictures gives better results. In order to generate the dynamic QP modulation for a single "B" picture between the "I" and "P" pictures or between two "P" pictures the following sequence would be followed. The final QP that is presented to the quantization parameter bus 112 is calculated through the following sequence.

For the "B" picture in the IBPBP sequence the final QP is calculated by using equation 4.

$$\text{Final\_QP} = \begin{cases} \text{Initial\_QP}, & \text{if Modulation\_base} < 2 \\ \text{Initial\_QP} + \frac{\text{Modulation\_base}}{2}, & \text{if Modulation\_base} >= 2 \end{cases} \quad (4)$$

For the "P" picture in the IBPBP sequence the final QP is calculated by using equation 5.

$$\text{Final\_QP} = \begin{cases} \text{Initial\_QP}, & \text{if Modulation\_base} < 2 \\ \text{Initial\_QP} - 1 - \frac{\text{Modulation\_base}}{4}, & \text{if Modulation\_base} >= 2 \end{cases} \quad (5)$$

When the IBPBP structure is compared to the scheme for IBBP structure, the only difference is B picture QP modulation. When the IBBP structure is used, the bit rate increase of each P picture can be compensated by the bit rate reduction of two B pictures. When the IBP structure is used, the bit rate increase of each P picture can only be compensated by the bit rate reduction of one B picture. Therefore, the QP level of B pictures is increased for the IBP structure to maintain the bit rate budget.

Although utilization of the B pictures can provide good encoding performance, their encoding complexity is much higher than encoding P pictures. Thus, for low complexity applications such as mobile device, an IP only structure is often used. However, every P picture is the reference for the subsequent P pictures in the IP only encoding structure. If only one reference frame is supported, one low quality P frame will influence the quality of the subsequent P frames. Fortunately, there are two fields for each frame in the interlace sequence. The quality of one field can be enhanced and let its good quality to propagate to the other field. Based on this understanding, the dynamic QP modulation scheme for IP only encoded interlace sequence is performed as follows.

For the first field in each "P" picture in the IPPP sequence the final QP is calculated by using equation 6.

$$\text{Final\_QP} = \begin{cases} \text{Initial\_QP}, & \text{if Modulation\_base} < 2 \\ \text{Initial\_QP} - 1, & \text{if Modulation\_base} >= 2 \end{cases} \quad (6)$$

For the second field in each "P" picture in the IPPP sequence the final QP is calculated by using equation 7.

$$\text{Final\_QP} = \begin{cases} \text{Initial\_QP}, & \text{if Modulation\_base} < 2 \\ \text{Initial\_QP} + 1, & \text{if Modulation\_base} >= 2 \end{cases} \quad (7)$$

The above scheme allows the picture level QP to increase and then decrease. In doing so, one field may use more bits to obtain good quality and propagate the quality to the next field. The next field may use fewer bits to satisfy the bit rate budget. Overall, better picture quality is obtained within the bit rate budget.

Another coding possibility is frame coding, which operates on every frame independently. The IPPP sequence may have a variable number of "P" pictures up to N. The dynamic QP modulation scheme is performed as follows.

For "P" pictures in the IPPP sequence the final QP is calculated by using equation 8.

$$\text{Final\_QP} = \begin{cases} \text{Initial\_QP} - 1, & \text{if } N < \text{Modulation\_base} \\ \text{Initial\_QP}, & \text{if } N >= \text{Modulation\_base} >= 2 \end{cases} \quad (8)$$

In equation 8, the value of N represents the number of "P" pictures that the current picture is away from the "I" picture.

Figure 2:
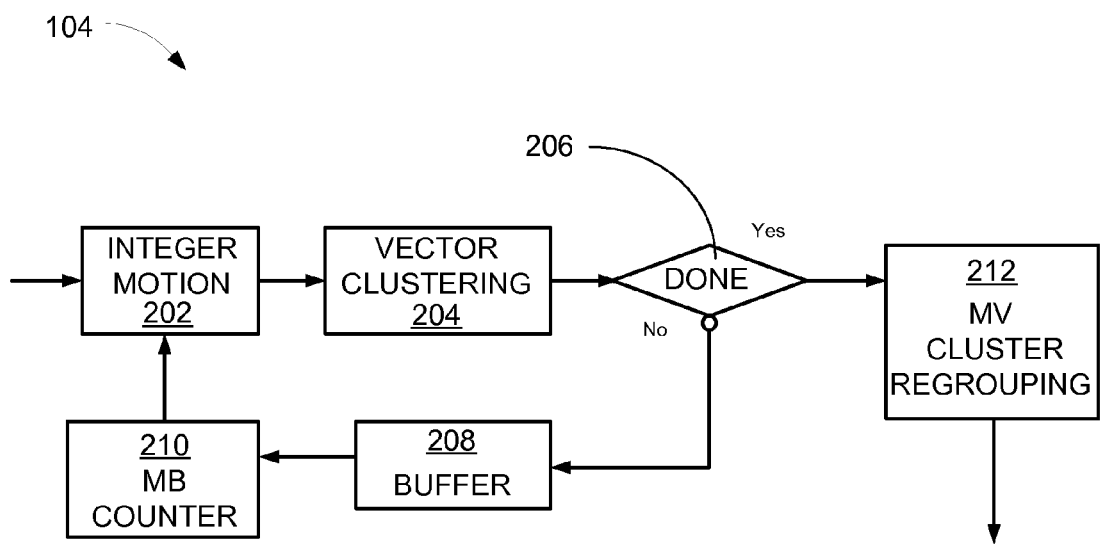
FIG. 2 is a block diagram of the stable motion circuit in a further embodiment of the present invention.

Referring now to FIG. 2, therein is shown a block diagram of the stable motion circuit 104, in a further embodiment of the present invention. The block diagram of the stable motion circuit 104 depicts an integer motion circuit 202 that receives input form the motion estimation circuit 102, of FIG. 1. Information is passed to the integer motion circuit 202 in a portion of a picture called a macro block. The macro block represents a 16 by 16 array of pixels within the picture. When a first macro block enters the integer motion circuit 202 its motion vector is measured and used as a motion threshold to compare the subsequent macro blocks.

The subsequent macro blocks are checked by a vector clustering circuit 204 for a substantially the same motion vector. If the motion vector is found to be substantially the same, the macro block is added to the current cluster. If the motion vector is not substantially the same as the threshold, it is skipped and will be checked again later. If the motion vector of the subsequent macro block is greater than the motion threshold, the macro block can be eliminated from the subsequent cluster. A decision circuit 206 determines whether the picture or slice is completely analyzed. If the analysis is not complete, the statistics of the macro block being analyzed are saved in a buffer 208 for later analysis.

A macro block counter 210 keeps track of all of the macro blocks that have been put into clusters thus far. All of the macro blocks of a picture will eventually be checked and added to a cluster. In some cases the last macro block may be in a cluster by itself. When the last macro block is complete the decision circuit 206 passes control to a motion vector cluster re-grouping circuit 212.

The motion vector cluster re-grouping circuit 212 eliminates clusters that are smaller than an area threshold (S1), which may be one eighth of the current picture size. The remaining clusters having a size greater than or equal to the minimum size are added together. The resulting size of the cluster determined by the motion vector cluster re-grouping circuit 212 is known as the stable motion area for the current picture. This information is saved in the buffer 208 for further operation.

An upper bound may be set for the number of clusters, in order to minimize the amount of buffer required to process the picture. When the number of clusters reaches the upper bound in the process of initial clustering, the clustering criterion is loosed. In the previous description, only the exactly same motion vectors are assigned to same cluster. When upper bound is reached, if the difference between the current motion vector and one cluster is less than a preset value (V1), the present value is assigned to the cluster; if the difference between the current motion vector and the cluster is larger than the preset value, it is skipped.

Figure 3:
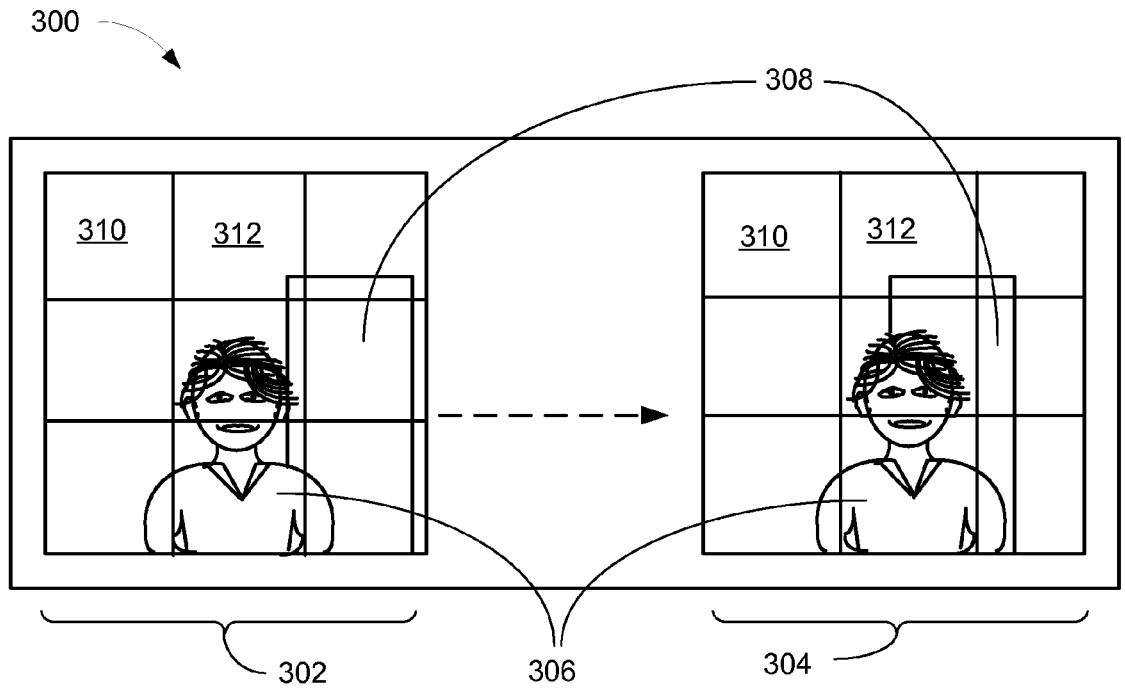
FIG. 3 is a group of pictures as might be displayed by the video coding system of the present invention.

Referring now to FIG. 3, therein is shown a group of pictures 300 as might be displayed by the video coding system 100 of the present invention. The group of pictures 300 depicts an Intra picture 302 on the left side of the group of pictures 300 and a subsequent picture 304 on the right side of the group of pictures 300. The subsequent picture 304 may be a "P" picture or a "B" picture and there may be additional pictures either before or after the subsequent picture 304.

A foreground object 306, such as a person, vehicle, or building, is centered in the lower frame of the Intra picture 302. A background object 308, such as sign, vehicle or a person is located at the far right side of the Intra picture 302. In the subsequent picture 304, the foreground object has not moved relative to the Intra picture 302, but the background object 308 has moved from the far right in the Intra picture 302 to the right center in the subsequent picture 304.

The group of pictures 300 is a very simplified example and in actual practice each of the Intra picture 302 or the subsequent picture 304 may have thousands of objects within their boundaries. For purposes of this example, a single moving background object is used to explain the operation of the video coding system 100.

Each of the Intra picture 302 and the subsequent picture 304 are divided into segments. A reference segment 310, such as a macro block, in the Intra picture is processed by the video coding system 100 in order to establish an initial reference for the group of pictures 300. A next segment, such as a macro block, is processed in successive order to complete the Intra picture 302.

The subsequent picture 304 is processed in a similar fashion as the Intra picture 302. As the reference segment 310 and a next segment 312 of the subsequent picture 304 are processed, changes in the reference segment 310 and the next segment 312 are stored. In the current example, the movement of the background object 308 is detected in several of the next segment 312. The changes are processed to generate and store information about the movement of objects in the next segment 312.

Figure 4:
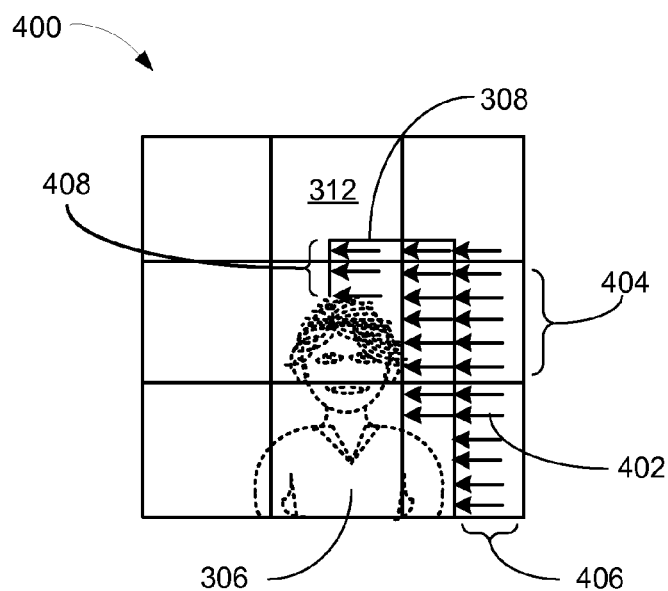
FIG. 4 is a motion vector analysis of an object moving through the GOP of FIG. 3.

Referring now to FIG. 4, therein is shown a motion vector analysis 400 of an object moving through the group of pictures 300 of FIG. 3. The motion vector analysis 400 depicts the position of the background object 308 and a number of motion vectors 402 indicating the position change of the background object 308 relative to the position of the background object 308 in the Intra picture 302, of FIG. 3. Some of the motion vectors 402 may be removed between pictures due to the presence of the foreground object 306, which may have no position change between the Intra picture 302 and the subsequent picture 304. The movement in the next segment 312 may be characterized by the motion vectors 402. Clusters 404 of the motion vectors 402 may be reflected across several of the next segment 312. The inclusion of several of the clusters 404, having substantially the same value of the motion vectors 402, defines a stable motion area 406. The motion vectors 402 are based on the movement of the background object 308 represented by a group of pixels 408.

The stable motion area 406 and the magnitude of the motion vectors 402 are used to determine the modulation that will be applied to the group of pictures including 302 and 304, of FIG. 3. By the QP modulation circuit 110, of FIG. 1, combining the initial quantization parameter, any changes to the quantization parameter based on the weighted picture size, and the modulation for the current picture a 0.7-4.4% increase in bit rate and up to a 0.7 dB increase in the peak signal to noise ratio may be achieved.

Figure 5:
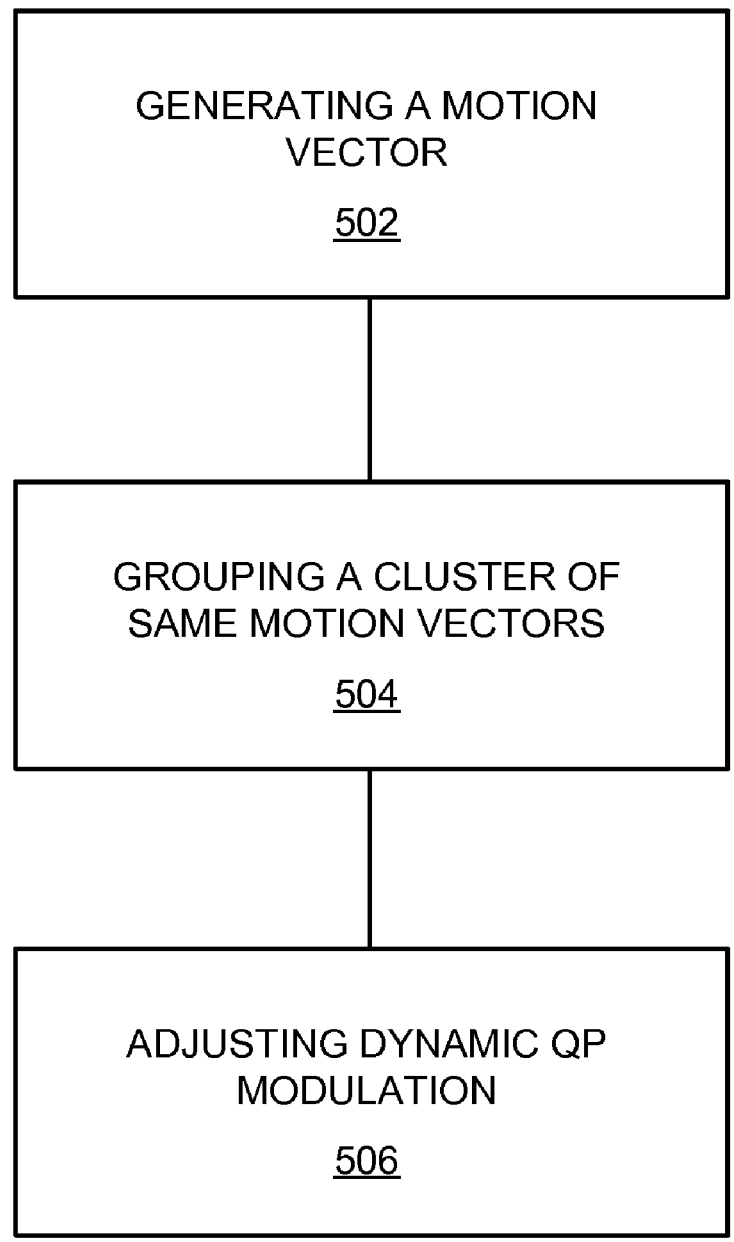
FIG. 5 is a flow chart of a video coding system for manufacturing a video coding system in an embodiment of the present invention.

Referring now to FIG. 5, therein is shown a flow chart of a video coding system 500 for manufacturing the video coding system 100 in embodiment of the present invention. The system 500 includes generating a motion vector for a macro block in a picture, the motion vectors indicative of displacement of an object in the macro block in a block 502; grouping a cluster of the motion vectors in a block 504; and adjusting a dynamic quantization parameter modulation of a subsequent picture based on the grouping for displaying the displacement of the object in the subsequent picture in a block 506.

It has been discovered that the present invention thus has numerous aspects.

A principle aspect that has been unexpectedly discovered is that the present invention may provide additional bit rate availability while increasing the peak signal to noise ratio for a group of pictures. This is done while not adding complex circuitry to the video coding device.

Another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the video coding system of the present invention furnishes important and heretofore unknown and unavailable solutions, capabilities, and functional aspects for efficiently coding video content for high definition applications. The resulting processes and configurations are straightforward, cost-effective, uncomplicated, highly versatile and effective, can be surprisingly and unobviously implemented by adapting known technologies, and are thus readily suited for efficiently and economically manufacturing video coding devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A video coding system comprising:
   generating motion vectors for macro blocks in a picture, the motion vectors indicative of displacement of an object in the macro blocks;
   grouping a cluster of the motion vectors;
   adjusting a dynamic quantization parameter modulation of a subsequent picture based on the grouping for displaying the displacement of the object in the subsequent picture;
   identifying a subsequent macro block within a subsequent picture; and
   grouping a subsequent cluster of subsequent motion vectors for the subsequent picture including eliminating the subsequent macro block having the subsequent motion vectors greater than a motion threshold includes eliminating the subsequent macro block in the subsequent cluster having the motion vectors greater than the motion threshold.

2. The system as claimed in claim 1 further comprising:
   comparing an area threshold for eliminating the cluster having the number of the macro blocks less than the area threshold; and
   determining a stable motion area in the subsequent picture by merging the cluster of the motion vectors substantially the same for determining the quality of a group of pixels.

3. The system as claimed in claim 1 further comprising:
   determining an area of the cluster of the motion vectors by a stable motion circuit;
   determining a modulation of the area of the cluster of the motion vectors; and
   generating a picture level quantization parameter by a quantization parameter modulation circuit for controlling the subsequent picture.

4. The system as claimed in claim 1 wherein grouping the cluster of the motion vectors includes combining the macro blocks having the motion vectors that are substantially the same for controlling a group of pixels.

5. The system as claimed in claim 1 further comprising determining a modulation base by comparing an average cluster size to a weighted picture size for displaying the subsequent picture.

6. A video coding system comprising:
   establishing a quantization parameter from an Intra picture in a group of pictures;
   identifying macro blocks within a subsequent picture including a Predicted picture or a Bidirectional predicted picture for dividing the picture into segments;
   generating motion vectors for the macro blocks including detecting a displacement of objects in the macro blocks;
   grouping a cluster of the motion vectors for the subsequent picture including:
      determining a stable motion area,
      eliminating the macro blocks having the motion vectors greater than a motion threshold includes eliminating the macro blocks in the cluster having the motion vectors greater than the motion threshold,
      combining the macro blocks having the motion vectors being substantially the same, and
      accumulating the macro blocks having the motion vector less than the motion threshold for controlling a group of pixels including forming the cluster having the motion vectors smaller than or substantially the same as the motion threshold; and
   adjusting a dynamic quantization parameter modulation for the cluster of the motion vectors for displaying the subsequent picture including adjusting the Predicted picture or the Bidirectional predicted picture.

7. The system as claimed in claim 6 further comprising:
   comparing an area threshold for eliminating the cluster having the number of the macro blocks less than the area threshold; and
   determining the stable motion area in the subsequent picture by merging the cluster of the motion vectors substantially the same for determining the quality of a group of pixels including grouping the macro blocks being contiguous and having the motion vectors substantially the same.

8. The system as claimed in claim 6 further comprising:
   analyzing the subsequent picture by a motion estimation circuit including generating the motion vectors for the macro blocks;
   determining an area of the cluster of the motion vectors in which the motion vectors in the cluster are substantially the same;
   determining a modulation based on the cluster of the motion vectors; and
   generating a picture level quantization parameter by a quantization parameter modulation circuit for controlling the subsequent picture in which the picture level quantization parameter having a different value for the Intra picture, the predicted picture and the bidirectional predicted picture.

9. The system as claimed in claim 6 further comprising determining a modulation base including:

determining a weighted picture size by dividing the number of the macro block in the Intra picture by an area threshold; and comparing an average cluster size of the subsequent picture to the weighted picture size for displaying a group of pixels including adjusting the modulation of the subsequent picture.

* * * * *